United States Patent
Lembo (10) Patent No.: US 7,780,886 B2
(45) Date of Patent: *Aug. 24, 2010

(54) INSULATION PRODUCT HAVING DIRECTIONAL FACING LAYER THEREON AND METHOD OF MAKING THE SAME

(75) Inventor: Michael J. Lembo, Souderton, PA (US)

(73) Assignee: Certainteed Corporation, Valley Forge, PA (US)

( * ) Notice: Subject to any disclaimer, the term of this patent is extended or adjusted under 35 U.S.C. 154(b) by 1899 days.

This patent is subject to a terminal disclaimer.

(21) Appl. No.: 10/793,496

(22) Filed: Mar. 4, 2004

(65) Prior Publication Data

US 2005/0081482 A1 Apr. 21, 2005

Related U.S. Application Data

(63) Continuation-in-part of application No. 10/690,295, filed on Oct. 21, 2003, now abandoned.

(60) Provisional application No. 60/540,764, filed on Jan. 30, 2004.

(51) Int. Cl.
*D04H 1/16* (2006.01)
*D04H 1/00* (2006.01)
*E04C 2/00* (2006.01)

(52) U.S. Cl. .................... 264/113; 428/292.1; 52/782.1

(58) Field of Classification Search ............... 428/292.1; 52/782.1
See application file for complete search history.

(56) References Cited

U.S. PATENT DOCUMENTS

| 244,172 | A | 7/1881 | Beebe |
| 705,920 | A | 7/1902 | Gottschalk |
| 751,542 | A | 2/1904 | McKenzie |
| 988,816 | A | 4/1911 | Reynolds et al. |
| 1,212,034 | A | 1/1917 | Eubanks |
| 1,238,356 | A | 8/1917 | Stokes |
| 1,402,319 | A | 1/1922 | Segesser |

(Continued)

FOREIGN PATENT DOCUMENTS

DE 2731729 A1 2/1979

(Continued)

OTHER PUBLICATIONS

Gullfiber Insulation with Gillfiber, Do-it-yourself, Dec. 1983.

(Continued)

*Primary Examiner*—D. Lawrence Tarazano
*Assistant Examiner*—Camie S Thompson
(74) *Attorney, Agent, or Firm*—Duane Morris LLP (57) ABSTRACT

An insulation product is provided comprising an insulation mat comprising randomly oriented fibers. The mat has first and second major surfaces and a pair of side portions. A vapor retardant facing layer is bonded to at least one of the major surfaces of the mat. The facing layer has a fiber orientation such that the facing layer has a ratio of machine direction tensile strength to cross machine direction tensile strength which permits the facing layer to be separated by hand along a substantially straight line selected in the machine direction.

33 Claims, 3 Drawing Sheets

U.S. PATENT DOCUMENTS

| | | | |
|---|---|---|---|
| 1,607,775 A | 11/1925 | Murray et al. |
| 1,702,660 A | 2/1928 | Mockel |
| 1,776,094 A | 7/1928 | Abramson |
| 1,783,657 A | 4/1930 | Kuntzleman |
| 3,048,513 A | 8/1962 | Hughes |
| 3,320,225 A | 5/1967 | Bradbury |
| 3,615,994 A | 10/1971 | MacLaine et al. |
| 3,704,975 A | 12/1972 | Bunting et al. |
| 3,812,002 A | 5/1974 | Lune |
| 3,835,604 A | 9/1974 | Hoffmann, Jr. |
| 3,910,145 A | 10/1975 | Bender, et al. |
| 3,947,977 A | 4/1976 | Bishop |
| 3,958,385 A | 5/1976 | Bondra, Jr. et al. |
| 3,964,232 A | 6/1976 | Bender et al. |
| 3,979,537 A | 9/1976 | Troyer |
| 4,025,680 A | 5/1977 | Botsolas et al. |
| 4,031,854 A | 6/1977 | Sprague, Jr. |
| 4,089,126 A | 5/1978 | Lang |
| 4,261,239 A | 4/1981 | Toboshi et al. |
| 4,342,610 A | 8/1982 | Ray, Jr. |
| 4,360,356 A | 11/1982 | Hall |
| 4,397,898 A | 8/1983 | Ray, Jr. |
| 4,410,316 A | 10/1983 | Yoke |
| 4,526,547 A | 7/1985 | Rusk |
| 4,689,020 A | 8/1987 | Rusk |
| 4,726,985 A | 2/1988 | Fay et al. |
| 4,738,556 A | 4/1988 | Brown |
| 4,756,945 A | 7/1988 | Gibb |
| 4,764,420 A | 8/1988 | Gluck et al. |
| 4,775,136 A | 10/1988 | Petersen |
| D298,439 S | 11/1988 | Rusk |
| 4,832,604 A | 5/1989 | Rusk |
| 4,835,045 A | 5/1989 | Kielmeyer et al. |
| 4,846,710 A | 7/1989 | Campbell |
| 4,866,905 A | 9/1989 | Bihy et al. |
| 4,917,929 A | 4/1990 | Heinecke et al. |
| 4,972,644 A | 11/1990 | Rumiesz, Jr. et al. |
| 5,046,392 A | 9/1991 | Keon et al. |
| 5,130,345 A | 7/1992 | Li et al. |
| 5,143,463 A | 9/1992 | Pozil et al. |
| 5,169,651 A | 12/1992 | Heiber et al. |
| 5,180,619 A * | 1/1993 | Landi et al. ............... 428/116 |
| 5,246,760 A | 9/1993 | Krickl |
| 5,269,743 A | 12/1993 | Sakuma |
| 5,277,955 A | 1/1994 | Schelhorn et al. |
| 5,331,787 A | 7/1994 | Paulitschke et al. |
| 5,336,346 A | 8/1994 | Meltzer et al. |
| 5,350,063 A | 9/1994 | Berdan et al. |
| 5,362,539 A | 11/1994 | Hall et al. |
| 5,505,553 A | 4/1996 | Saviano et al. |
| 5,529,563 A | 6/1996 | Veith et al. |
| 5,545,279 A | 8/1996 | Hall et al. |
| 5,545,453 A | 8/1996 | Grant et al. |
| 5,567,504 A | 10/1996 | Schakel et al. |
| 5,642,601 A | 7/1997 | Thompson, Jr. et al. |
| 5,662,423 A | 9/1997 | Walden |
| 5,683,037 A | 11/1997 | Rochman et al. |
| 5,727,367 A | 3/1998 | Cahill et al. |
| 5,765,318 A | 6/1998 | Michelsen |
| 5,781,976 A | 7/1998 | Stunhlbacher et al. |
| 5,817,387 A | 10/1998 | Allwein et al. |
| 5,848,509 A | 12/1998 | Knapp et al. |
| 5,849,131 A | 12/1998 | Shaffer et al. |
| 5,900,298 A | 5/1999 | Syme et al. |
| 5,912,026 A | 6/1999 | Gokcen et al. |
| 5,971,266 A | 10/1999 | Sampaolo et al. |
| 5,980,257 A | 11/1999 | Heinz |
| 6,007,902 A | 12/1999 | Adur et al. |
| 6,083,594 A | 7/2000 | Weinstein et al. |
| 6,083,603 A | 7/2000 | Patel et al. |
| 6,128,884 A | 10/2000 | Berdan, II et al. |
| 6,141,930 A | 11/2000 | Allwein et al. |
| 6,148,702 A | 11/2000 | Bucks |
| 6,165,305 A | 12/2000 | Weinstein et al. |
| 6,170,369 B1 | 1/2001 | Weinstein et al. |
| 6,191,057 B1 | 2/2001 | Patel et al. |
| 6,215,901 B1 | 4/2001 | Schwartz |
| 6,301,854 B1 | 10/2001 | Daudet et al. |
| 6,314,771 B1 | 11/2001 | Ahrweiler et al. |
| 6,328,494 B1 | 12/2001 | Moxon |
| 6,357,504 B1 | 3/2002 | Patel et al. |
| 6,378,258 B1 | 4/2002 | Cunningham et al. |
| 6,383,594 B2 | 5/2002 | Weinstein et al. |
| 6,468,615 B2 | 10/2002 | Weinstein et al. |
| 6,484,463 B1 | 11/2002 | Fay et al. |
| 6,551,677 B2 * | 4/2003 | Weinstein et al. ............. 428/43 |
| 6,666,809 B1 | 12/2003 | John |
| 6,670,011 B2 | 12/2003 | Weinstein et al. |
| 6,740,188 B2 | 5/2004 | Allwein et al. |
| 6,743,326 B2 | 6/2004 | Bogrett et al. |
| 6,925,765 B2 | 8/2005 | Fay et al. |
| 6,935,080 B2 | 8/2005 | Allwein et al. |
| 2001/0030018 A1 | 10/2001 | Weinstein et al. |
| 2002/0015814 A1 | 2/2002 | Weinstein et al. |
| 2002/0017590 A1 | 2/2002 | Fay et al. |
| 2002/0029929 A1 | 3/2002 | Tinianov |
| 2002/0040556 A1 | 4/2002 | Weinstein et al. |
| 2002/0114913 A1 | 8/2002 | Weinstein et al. |
| 2002/0136854 A1 | 9/2002 | Smith et al. |
| 2002/0162292 A1 | 11/2002 | Fay |
| 2002/0193231 A1 | 12/2002 | Bauer |
| 2003/0022580 A1 | 1/2003 | Bogrett et al. |
| 2003/0032350 A1 | 2/2003 | Kajander et al. |
| 2003/0032762 A1 | 2/2003 | Taylor |
| 2003/0148686 A1 | 8/2003 | Weinstein et al. |
| 2003/0175466 A1 | 9/2003 | Bogrett et al. |
| 2003/0183055 A1 | 10/2003 | Allwein et al. |
| 2003/0186037 A1 | 10/2003 | Edge et al. |
| 2003/0221772 A1 | 12/2003 | Allwein et al. |
| 2003/0224145 A1 | 12/2003 | Campion et al. |
| 2003/0236043 A1 | 12/2003 | Calzavara et al. |
| 2004/0003563 A1 | 1/2004 | Burdic |
| 2004/0025653 A1 | 2/2004 | Bascom et al. |
| 2004/0055227 A1 | 3/2004 | Allwein et al. |
| 2004/0074262 A1 | 4/2004 | Miele et al. |
| 2005/0067091 A1 | 3/2005 | Kissell et al. |
| 2005/0067092 A1 | 3/2005 | Houpt et al. |
| 2005/0081481 A1 | 4/2005 | Toas et al. |
| 2005/0081482 A1 | 4/2005 | Lembo |
| 2005/0166536 A1 * | 8/2005 | Lembo et al. ............ 52/745.19 |
| 2005/0183386 A1 | 8/2005 | Lembo |

FOREIGN PATENT DOCUMENTS

| | | |
|---|---|---|
| DE | 3229601 A1 | 3/1984 |
| DE | 3203624 A1 | 11/1989 |
| DE | 4108110 A1 | 12/1991 |
| DE | 93 02 056.2 | 8/1993 |
| DE | 197 00 373 A1 | 2/1998 |
| DE | 3118597 A1 | 2/1998 |
| DE | 4435317 A1 | 4/1998 |
| DE | 19914782 | 10/2000 |
| DK | 126212 | 6/1973 |
| EP | 0067088 A2 | 12/1982 |
| EP | 101376 B1 | 2/1984 |
| EP | 0732464 A1 | 9/1996 |
| GB | 1358345 | 7/1974 |
| GM | 78 30 852 | 1/1979 |
| GM | 79 20 480 | 11/1979 |
| JP | 05256454 | 9/1993 |
| WO | WO 98/42930 | 10/1998 |

| | | | |
|---|---|---|---|
| WO | WO 01-63063 A1 | 8/2001 | |

OTHER PUBLICATIONS

Superfos Glass Wool, Glasuld Perfofilt, Jan. 1975 (Product Literature).

Gullfiber M-Skiva, Mar 1984 (Product Literature).

Johns Manville, Easyfit, 2002 (Product Literature).

Johns Manville, Formaldehyde-free, 2002 (Product Literature).

International Search Report and Written Opinion issued for PCT/US05/06404, mailed Mar. 1, 2007.

Iowa Energy Center, "The Basement" http://www.energy.iastate.edu/efficiency/residental/homeseries/insulation/basement.htm, Oct. 17, 2003.

Johns Manville, "Formaldehyde-Free," (Unfaced Fiber Glass Insulation/Kraft-Faced Fiber Glass Insulation) © 2002.

O'Neil Machinery Sales, "Cutter," http://www.oneilmachinery.com/detail.asp?id=5214, Oct. 22, 2003.

Precision Airconvey Corporation (PAC), "78-GB Series Grandulator—Internal View," http://www.precisioncutters.com/products/granulator/model178g/inside78g.htm, Oct. 20, 2003.

Cutter Knife, http://sundoeng.co.kr/cutterknifemain.htm, Oct. 22, 2003.

Superfos Glasuld, Glasuld Perfofilt" Glass Perfofilt "Glass Wool Products, Glasuld Perfofilt, Jan. 1975.

Corfine, "Soft Anvil Web-Fed Rotary Die", Dec. 9, 2003.

GWJ Company, "Trim, Matrix, Waste Removal Systems" http:/www.flexopress.com/trimremoval/trimremoval.html Dec. 20, 2003.

David K. Hart Company (Hart Co.), "Soft Anvil Die Cutting System" http://www.die-cut.com/sovt_anvil.html Jun. 16, 2003.

BC Hydro, "Band Joist Insulation" http://www.bchydro.com/powersmart/elibrary/elibrary642.html?printnow, Oct. 17, 2003.

Bernal, Single-Slot Modules, http://www.bernaltech.com/content.asp?pageID=16, Dec. 9, 2003.

Certainteed, "Fiber Glass Insulation", http://insulation.certainteed.com/cinsulate/cict00001p.html, Jan. 13, 2003.

Certainteed, "Standard Batts and Rolls", http://insulation.certainteed.com/cinsulate/cict00101p.html, Jan. 13, 2003.

Commodore Plastics, http://www.commodoreplastics.com/content_grinder.html, Oct. 20, 2003.

Corfine, Soft Anvil Web-Fed Rotary Die Cutter, Jan. 6, 2004.

Office Action dated Dec. 8, 2008 in related U.S. Appl. No. 11/093,497 (child application).

* cited by examiner

INSULATION PRODUCT HAVING DIRECTIONAL FACING LAYER THEREON AND METHOD OF MAKING THE SAME

CROSS-REFERENCE TO RELATED APPLICATIONS

This application is a continuation-in-part of, commonly assigned patent application: U.S. patent application Ser. No. 10/690,295, entitled "Separable Fibrous Insulation", filed Oct. 21, 2003 now abandoned. This application is also related to the following copending, commonly assigned patent applications: U.S. Provisional Application No. 60/540,764, entitled "Segmented Band Joist Batts and Method of Manufacture", filed Jan. 30, 2004; U.S. Provisional application Ser. No. 10/851,877, entitled "Kit of Parts for Band Joist Insulation and Method of Manufacture", filed Jan. 30, 2004; and U.S. Utility patent application Ser. No. 10/799,181, entitled "Method and Apparatus for Adhering Together Lanes of Compressible Products", filed Feb. 11, 2004, now U.S. Pat. No. 7,060,148.

FIELD OF THE INVENTION

The present invention relates to insulation products and methods of making the same, and more particularly to insulation products having facing layers thereon and methods of making the same.

BACKGROUND OF THE INVENTION

When insulating structures, typically residential homes, the installer often encounters framing members that are spaced apart at nonstandard distances less than the standard spacing relationship. When insulating these elongated cavities of various nonstandard widths, less than a standard width, it has been the practice to take an insulation batt preformed to fit the standard cavity width and reduce the width of the insulation batt by cutting off and removing a strip of insulation material from one or both longitudinal edges of the insulation batt. This method of trimming the insulation batts at the job sight by cutting the batts to fit between the more closely spaced support members is time consuming, raises a significant risk or safety issue and relies heavily on the worker's skill to accurately trim the batt or panel.

U.S. Pat. No. 6,551,677 to Weinstein et al., entitled "Facing for Pre-Cut Fibrous Insulation Blankets", issued Apr. 22, 2003, (Weinstein I) the entirety of which is hereby incorporated by reference herein, describes an elongated insulation blanket that has a series of cuts extending between the major surfaces of the blankets with successive cuts being separated by a series of separable connectors located intermediate the major surfaces of the blanket. Each series of separable connectors holds together adjacent sections of the blanket for handling, but are separable by hand so that the blanket can be handled as a unit for insulating a cavity having a predetermined width or separated by hand into two or more sections at one or more of the series of the separable connectors for insulating a cavity having a lesser, nonstandard width. The blanket has a facing bonded thereto by a bonding agent, having one or more perforated lines in the facing that permit the facing to be separated by hand at each series of cuts and separable connectors.

Although Weinstein I provides a modular mat that can be separated into insulation mats of smaller widths, the use of a perforated facing layer raises several issues. For example, additional steps must be employed to form perforations in the facing layer. Further, it is believed that the perforations may provide breaches in the vapor barrier provided by the facing layer if the bonding agent does not fully or adequately fill the perforations. These localized vapor barrier failures compromise the effectiveness of the insulation mat when the mat is used with, for example, support members spaced at standard widths, i.e., when the separable segments of the mat are not removed.

U.S. Pat. No. 6,468,615 to Weinstein et al., entitled "Pre-Cut Fibrous Insulation Blanket", issued Oct. 22, 2002 (Weinstein II), the entirety of which is hereby incorporated by reference herein, also describes insulation mats having permeable sheets on a first and/or second major surface of that mat, where the permeable sheets are separable by hand due to the low tear strength of the sheets. The sheets are described as having the tear strength about equal to the tear strength or tensile strength of facial or bathroom tissue. These permeable sheets are not vapor barrier facing layers, which are also shown coupled to the mats.

Therefore, there is a need for an insulation product, and method of making the same, that can be formed into sections having nonstandard widths, but without significant field work and without compromising the vapor barrier formed on the insulation product.

SUMMARY OF THE INVENTION

An insulation product is provided comprising an insulation mat comprising randomly oriented fibers. The mat has first and second major surfaces and a pair of side portions. A vapor retardant facing layer is bonded to at least one of the major surfaces of the mat. The facing layer has a fiber orientation such that the facing layer has a ratio of machine direction tensile strength to cross machine direction tensile strength which permits the facing layer to be separated by hand along a substantially straight line selected in the machine direction.

A method of manufacturing an insulation product is also provided comprising the following steps: providing an insulation mat comprising randomly oriented fibers, the mat having first and second major surfaces and a pair of side portions; and adhering a vapor retardant facing layer to at least one of the major surfaces of the mat, the facing layer having a fiber orientation such that the facing layer has a ratio of machine direction tensile strength to cross machine direction tensile strength which permits the facing layer to be separated by hand along a substantially straight line selected in the machine direction.

From the foregoing, a modular faced insulation product is provided that provides for user friendly field separation into smaller segments while not compromising the vapor retarder barrier thereon. In some embodiments, a facing layer having reduced width and/or paper weight but of sufficient cross machine direction tear strength may be achieved. The process of forming a faced insulation product is also simplified in that various facing layers each having different perforation locations are not required for different modular products and need not be stored and/or the step of perorating the facing layer can be eliminated or reduced. Cost saving attributable to materials and storage thereof may be realized.

In one embodiment, an insulation product is provided including an insulation mat comprising randomly oriented fibers, the mat having first and second major surfaces and a pair of side portions, and a facing layer comprising cellulosic fibers, such as a cellulosic paper, bonded to the insulation mat with a vapor retardant adhesive. The facing layer includes a central portion coextensive with the at least one major surface and at least one tab portion adjacent the central portion and extending beyond the at least one major surface. The layer or paper has a fiber orientation such that a ratio of machine direction tensile strength to cross machine direction tensile strength in the facing layer is at least about 4:1, preferably about 4:1 to 20:1. and more preferably 6:1 to 15:1. The facing layer is also preferably non-perforated in at least the machine direction. The insulation mat includes a plurality of separable segments. The segments are coupled to each other along at least one plane oriented in the machine direction.

A method of forming a reduced width insulation product from a master insulation product for installation in a structure is also provided comprising the following steps: (a) providing a master insulation product comprising an insulation mat comprising randomly oriented fibers, the mat having first and second major surfaces and a pair of side portions; and a facing layer comprising a cellulosic paper bonded to the insulation mat with a vapor retardant adhesive, the facing layer having a fiber orientation such that the facing layer has a ratio of machine direction tensile strength to cross machine direction tensile strength which permits the facing layer to be separated by hand along a substantially straight line selected in the machine direction, wherein the insulation mat includes a plurality of separable segments, the segments being coupled to each other along at least one plane oriented in the machine direction; and (b) separating the facing layer in the machine direction substantially along a plane from said at least one plane to remove at least one of the separable segments from the master insulation product, thereby providing a reduced width insulation product.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

As used herein, the following terms are defined:

"Mat" means a fibrous material consisting of randomly oriented filaments, short fibers (with or without a carrier fabric), or swirled filaments held together with a binder, and are available in blankets of various thicknesses, widths, weights, and lengths. As used herein, "Insulation Mat" includes insulation boards, such as duct boards, insulation batts and acoustic insulation;

"Machine Direction" as used herein with respect to a layer means the direction in which the greater number of the fibers of a sheet of paper tend to be oriented as a result of the forward motion of the wire of the papermaking machine. The paper so produced is stronger in the machine direction, and also experiences less dimensional variation in the machine direction due to changes in humidity.

"Cross Machine Direction" with respect to a layer means the direction at right angles to the machine direction;

"Tensile Strength" means the load or force required to break a specimen;

"Tear Strength" means the force required to tear a layer at a precut edge, to a specific length, and measured in milli-Newton. This property is typically importance for printing, writing and wrapping papers.

Provided herein are methods for manufacturing faced insulation products and the faced insulation products made thereby. Insulation materials generally span the range from light weight, flexible and resiliently compressible foams and nonwoven fiber webs to rigid or semi-rigid boards. Generally, these insulating materials have densities in the range of about 0.5-7 $lb/ft^3$ (8-112 $kg/m^3$). Foam and nonwoven fiber web materials are usually provided in continuous sheeting that is sometimes cut to preselected lengths, thus forming batts. These articles are usually characterized as "low density," having a density in the range of about 0.5-6 $lb/ft^3$ (8-96 $kg/m^3$), and preferably about 1-4 $lb/ft^3$ (16-64 $kg/m^3$), and more preferably 0.3 to 1.5 $lb/ft^3$ (4.8-24 $kg/m^3$). The thickness of the insulation blanket or mat is generally proportional to the insulated effectiveness or "R-value" of the insulation. These low density insulation mats typically have a thickness between about 3.5-10 inches.

In contrast, rigid to semi-rigid insulation boards ("high density" insulation) tend to have densities in the higher portion of the range, at about 2-7 $lb/ft^3$ (32-112 $kg/m^3$), and preferably at about 4-7 $lb/ft^3$ (64-112 $kg/m^3$). These boards customarily are produced as sheets typically having a thickness in the range of about 0.25-2 inches, and more preferably about 0.5-2 inches, and about 2-4 feet wide by about 4-12 feet in length.

Figure 1:
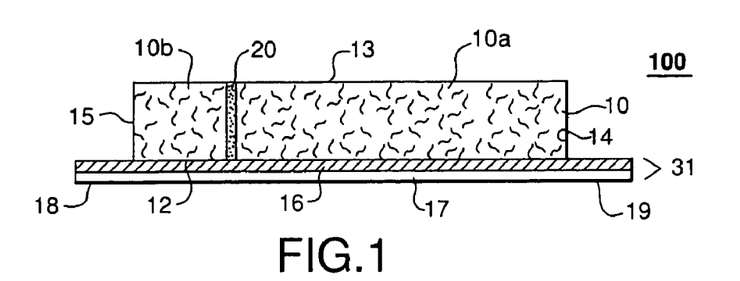
FIG. 1 is a side elevation view of an insulation product of this invention.

With reference to the Figures, and more particularly to FIG. 1 thereof, insulation product 100 is shown. Insulation product 100 includes insulation sheet 10, which may comprise a high or low density insulation mat or board, as described above, formed from organic fibers such as polymeric fibers or inorganic fibers such as rotary glass fibers, textile glass fibers, stonewool (also known as rockwool) or a combination thereof. Mineral fibers, such as glass, are preferred. Insulation sheet 10 includes first and second major surfaces 12, 13 and longitudinal side portions 14, 15. In some embodiments, a vapor retarder facing layer 17, which may be a cellulosic paper, typically formed from Kraft paper, coated with a bituminous adhesive material, such as asphalt, polymeric resin, or polymeric film, such as LDPE (low density polyethylene), or a combination of these materials, is provided on one major surface 12 of the insulation sheet 10. In one preferred embodiment, the facing layer 17 and bituminous layer 16 together form bitumen-coated Kraft paper 31. The coating is preferably applied in a sufficient amount so as to provide an effective barrier or retarder for water vapor, for example, so as to reduce the water vapor permeability of the Kraft paper to no more than about one perm when tested by ASTM E96 Method A test procedure. Optionally, the facing layer 17 can be secured to the bottom of major surface 12 of the insulation sheet by an adhesive, such as a hot-melt adhesive. Additional details of facing layer 17 are provided below.

Insulation product 100 may include a pair of optional side tabs 18 and 19 that can be fastened to wooden or metal studs, for example. Various known configurations for side tabs or flaps 18 and 19 are known. Alternatively, there can be no tabs on the Kraft facing. The facing layer 17 can be water vapor impermeable or permeable, depending on its makeup, degree of perforation and intended use.

In an exemplary embodiment, insulation sheet 10 is a low density matt or batt formed from glass fibers bound together with a heat cured binder, such as known resinous phenolic materials, like phenolformaldehyde resins or phenol urea formaldehyde (PUFA). Melamine formaldehyde, acrylic, polyester, urethane and furan binder may also be utilized in some embodiments. The insulation is typically compressed after manufacture and packaged, so as to minimize the volume of the product during storage and shipping and to make handling and installation of the insulation product easier. After the packaging is removed, the batt insulation product 100 tends to quickly "fluff up" to its prescribed thickness for insulation.

Referring again to FIG. 1, insulation mat 10 includes first separable segment 10a and second separable segment 10b separably connected to each other in one embodiment with an adhesive 20, such as a hot melt adhesive, such hot melt adhesives available from Henkel Adhesives as product #80-8273. Although mat 10 is illustrated as including two separable segments 10a, 10b, this is for illustrative purposes only and mat 10 can include any number of separable longitudinal segments. Mat 10 may be sized to fit between support members spaced at standard widths, while segments 10a, 10b can be sized to accommodate anticipated, nonstandard or standard spacings. In one embodiment of the mat 10 of FIG. 1, mat 10 has a total width between about 11-24". In this embodiment (assuming a product of roughly 15-16" in width), section 10a has a width between about 9-13" and section 10b has a width between about 2-7".

Although FIG. 1. illustrates adhesive layer coupling segments 10a and 10b together along substantially the entire thickness and length of the insulation mat 10, this is not a requirement. For example, the adhesive layer need not extend the entire length of the interior surfaces of the segments in plane 22. Rather, the adhesive layer can be intermittently applied on the surfaces along the length of segments 10a and/or 10b. In one embodiment, the adhesive layer 20 may comprise one ore more adhesive strips located between the first and second major surfaces 12, 13 and extending along the inner surfaces segments 10a and/or 10b. In one embodiment, mat 10 is approximately 15" wide and has a thickness of approximately 3.5". In this embodiment, 1" adhesive bond should provide sufficient adhesion between separable segments 10a and 10b. In one embodiment, a first longitudinal strip of adhesive having a height of about 0.5" is applied approximately 1" above the first major surface 12 and along an interior surface of segment 10a and/or 10b and a second longitudinal strip of adhesive having a height of about 0.5" is applied approximately 1" below the second major surface 13 and along an interior surface of segment 10a and/or 10b. In a second embodiment, mat 10 is approximately 15" wide and has a thickness of approximately 6.25". In this embodiment, a 2" adhesive bond should provide sufficient adhesion between separable segments 10a and 10b. In one embodiment, a first 0.5" longitudinal strip of adhesive is applied approximately 1" above the first major surface; as second 0.5" longitudinal strip of adhesive is applied approximately 0.5" above the first longitudinal strip; a third 0.5" longitudinal strip of adhesive is applied approximately 1.25" above the second longitudinal strip; and, a fourth 0.5" longitudinal strip of adhesive is applied approximately 0.5" above the third longitudinal strip and approximately 1" from the second major surface 13.

Figure 2:
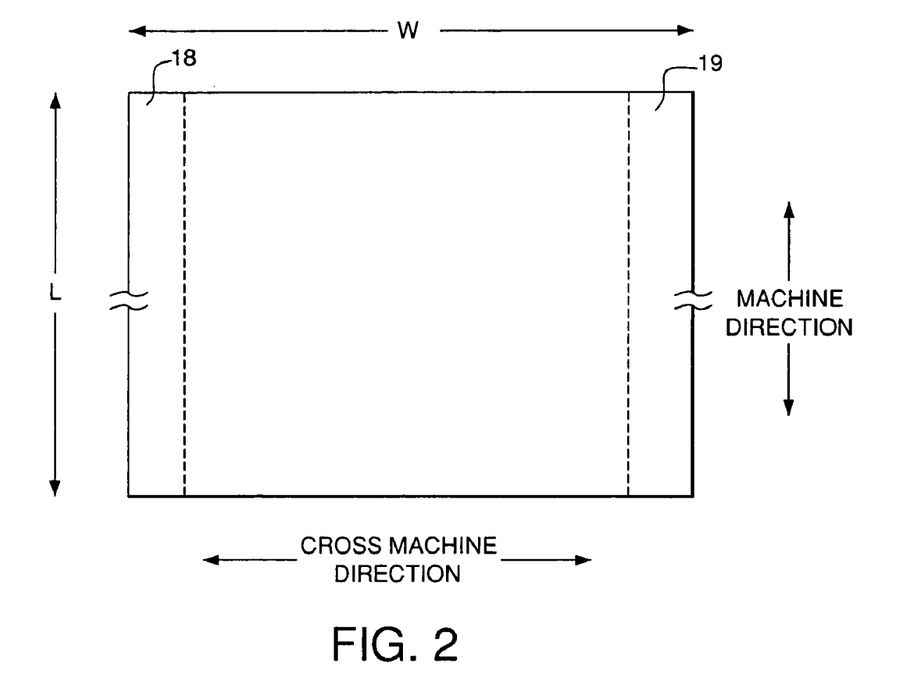
FIG. 2 is a bottom plan view of the insulation product of FIG. 1.

FIG. 2 is a bottom plan view of insulation product 100. The dashed lines illustrate the position of tabs 18 and 19, and do not illustrate perforations. Insulation product 100 has a defined width W and length L, which may vary depending on whether insulation product 100 is provided in roll or batt form. In an exemplary embodiment of insulation product 100, facing layer 17 comprises a cellulosic fiber containing material, such as a cellulosic paper, preferably a directional Kraft paper having fibers oriented in substantially the machine direction, as opposed to the cross machine direction. Alternatively, a polymeric film, woven knit or nonwoven with anisotropic mechanical properties can be used. Mixtures of polymeric, cellulosic and inorganic fibers can be used. These alternative facing layers may be coupled to the mat with, for example, a hot melt adhesive.

Facing layer 17 is shown coextensive with major surface 12 of insulation mat 10 and is preferably not perforated, at least in the machine direction, thereby providing a continuous vapor barrier or retarder for insulation mat 10 in conjunction with coating 16. The machine direction fiber orientation imparts greater tensile strength in facing layer 17 in the machine direction compared to the cross machine direction and, it is believed, improves the tear strength ratio of cross machine direction tear strength to machine direction tear strength. Tear strength, while being inversely proportional to tensile strength, to some extent is also a factor of paper thickness and paper weight.

Conventional non-directional Kraft paper, such as EXOPACK 40# semi-extensible Kraft paper manufactured by Canfor Co. of Vancouver, British Columbia or International Paper Co. of Stamford, Conn., which, by definition, does have fibers oriented in the machine direction but not to the extent of the substantial orientation of the fibers in the directional Kraft paper, does not exhibit noticeable "anisotropy" in other physical characteristics, such as the relative difference in tear strength between the cross machine direction and machine direction. For example, the EXOPACK 40# product exhibits a machine direction tensile strength to cross machine direction tensile strength ratio of about 2.5:1 but a machine direction to cross machine direction tear strength ratio of only about 5:4 as discerned from the product specification/vendor sample property sheets. This relatively unitary tear strength ratio does not allow for the easy creation of clean, straight tears in the paper in the machine direction without the aid of a cutting tool. In other words, the paper exhibits unintended and significant propagation of the tear in the cross direction.

Although it is preferred that the fiber orientation is such that the facing layer has a ratio of machine direction tensile strength to cross machine direction tensile strength which permits the facing layer to be separated by hand along a substantially straight line selected in the machine direction, and thus the tear strength of the layer 17 is sufficiently higher in the cross machine direction than the machine direction, the difference should not be so great such that the separable segments are prone to unplanned separation, such as during shipping or packaging or during deployment of product 100 as a unitary product rather than separable segments. In one embodiment, the ratio of the machine direction tensile strength to cross machine direction tensile strength in facing layer 17 is at least about 4:1, and more preferably at least about 6:1, and still more preferably at least about 8:1. In one embodiment, the ratio is between about 4:1 to 20:1, and more preferably, between about 6:1 to 15:1, and more preferably between about 8:1 to 11:1.

The preferred facing layer has been described in terms of its fibers and fiber orientation being selected to provide a specified ratio of machine direction tensile strength to cross machine direction tensile strength sufficient to provide a cross machine direction tear strength to machine direction tear strength, such as measured by the Elmendorf Tear test. The machine direction and cross direction tear strengths are not believed to be linearly related to tensile strength, and do depend at least in part on paper weight and thickness.

In any event, the ratio of the machine direction tensile strength to cross machine direction tensile strength is preferably selected such that facing layer 17 can be torn or otherwise easily separated along plane 22 (FIG. 2) in the machine direction (parallel to longitudinal edges 14, 15) that separates the separable segments of mat 10 without the use of perforations in layer 17 and without the propagation of the tear significantly in the cross machine direction. The absence of perforations in layer 17 prevents possible breaches of the vapor barrier in layer 31 at the perforations, particularly when the insulation product is used between support members spaced at standard distances, i.e., when the separable segments are not removed from the mat 10. Still further, the layer 17 can be torn in the machine direction at any location along the width W of mat 10. This feature allows the manufacturer to locate the connection between the separable segments of insulation mat 10 (shown at adhesive connection 20 of FIG. 1) at any point along the width of mat 10 without changing the configuration of layer 17. With prior art mats, the perforation location in the facing layer would have to be adjusted to align with the connection of the separable segments if they were resized. This feature, therefore, helps to simplify the manufacturing process and can reduce or eliminate the need to store facing layers having variably located longitudinal perforations.

Figure 1A:
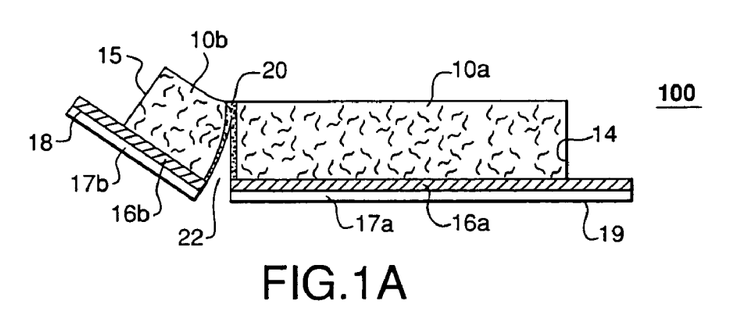
FIG. 1A is a side elevation view of the insulation product of FIG. 1 shown partially separated along its length.
Figure 2A:
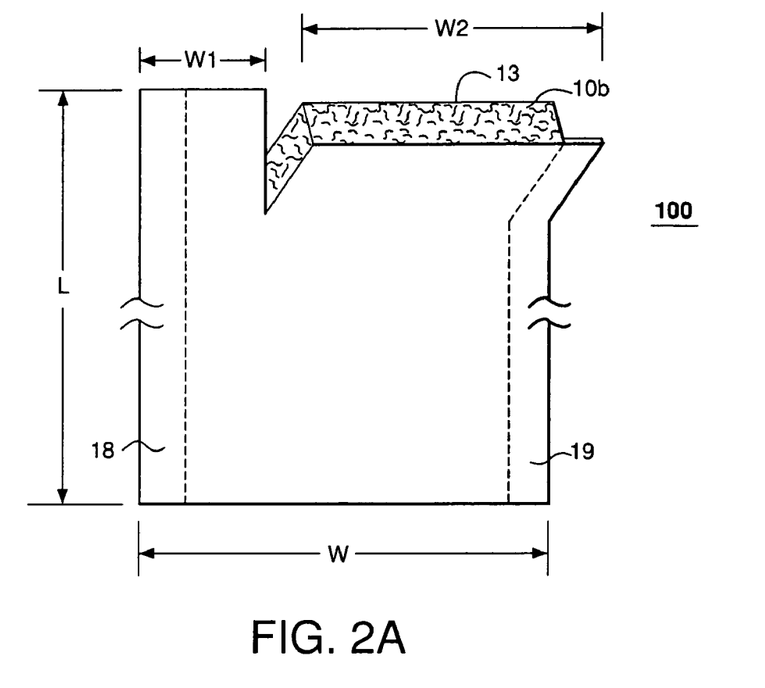
FIG. 2A is a bottom plan view of the insulation product of FIG. 1 shown partially separated along its length.
Figure 5:
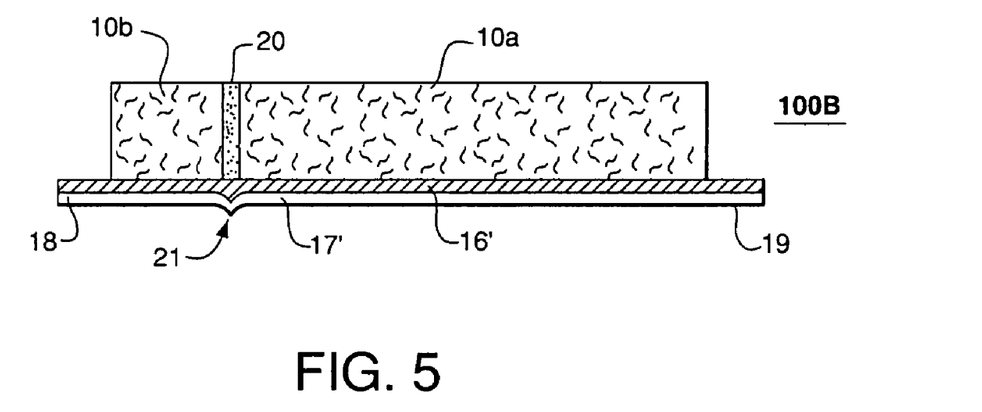
FIG. 5 is a side elevation view of an insulation product having a creased facing layer.

FIG. 1A illustrates separable segments 10a and 10b and facing layer 31 partially separated starting from first major surface 12 towards second major surface 13. Alternatively, the segments can be separated starting from second major surface 13 towards first major surface 12 as shown in the partial separation illustrated by FIG. 2A. The connection between separable segments and the tear strength/tensile strength of the facing layer 17 in the machine direction are preferably selected to allow for a field separation, such as by tearing by hand without the aid of a tool, such as a cutting tool, although this option is not precluded. In one embodiment, prior to tearing facing layer 17 in the field, layer 17 is creased at a selected location in the machine direction to further aid is creating a straight, clean tear. For example, segments 10a and 10b can be separated starting from second major surface 13 towards first major surface 12 and towards facing layer 31. Once segments 10a and 10b are separated, facing layer 31 is then creased at the separation between the separable segments and then torn in the machine direction in a clean, longitudinal tear to form two separate faced longitudinal mat segments. Alternatively, the layer 17 may be pre-creased in the machine direction at the desired tear location, i.e., creased prior to gluing or otherwise bonding the layer 17 to the major surface of the mat. This embodiment 100B is illustrated in FIG. 5, showing longitudinal crease 21 in the facing layer 17', which is coupled to the insulation mat by adhesive layer 16'.

The increased machine direction strength also provides increased resistance against tearing in tabs 18 and 19 when tabs 18 and 19 are secured to framing members, such as by staples or other fastening means. Although tabs 18 and 19 may be folded one or more times to increase the thickness of tabs 18 and 19, thereby increasing their tear strength, the improved tear resistance may permit tabs 18 and 19 to comprise a single layer of paper 17, i.e., tabs 18 and 19 may be deployed as unfolded tabs. This, in turn, reduces the original width of the layer 17 by, for example, about 10% (assuming 2 inches are removed from a 20 inch wide facing layer affixed to mat 10), thereby reducing the cost of the paper, the cost of storing the paper and the cost of insulation product 100. Still further, because of the increased cross-direction tear strength of the layer 17, it may be possible to use lighter weight paper, thereby further reducing the cost of the product 100 as well as its weight.

In one embodiment, layer 17 comprises a 15-40 pound/ 2880 ft$^2$ directional Kraft paper, more preferably a 27-37 pound directional Kraft papers, such as is available from Lydall, Inc. of Manchester, Conn. Examples of directional Kraft paper available from Lydall, Inc. include:

| Product | Property | English Units | Metric Units | Test Method |
|---|---|---|---|---|
| 18-1/2# Manning ® 456 | Basis Weight | 18 (lb/2880 ft$^2$) | 30.5 (g/m$^2$) | TAPPI T-410 |
| | Thickness | 3 (mil) | 0.076 (mm) | TAPPI T-411 |
| | Tensile: | | | |
| | Machine Direction | 26 (lb/in) | 11.6 (Kg/25 mm) | Manning Test |
| | Cross machine direction | 2.9 (lb/in) | 1.3 (Kg/25 mm) | #020 |
| | Tear (Machine Direction) | 55 (g) | 55 (g) | TAPPI T-414 |
| 27-1/2# Manning ® 556 | Basis Weight | 26.5 (lb/2880 ft$^2$) | 44.2 (g/m$^2$) | TAPPI T-410 |
| | Thickness | 4.1 (mil) | 0.104 (mm) | TAPPI T-411 |
| | Tensile: | | | |
| | Machine Direction | 36 (lb/in) | 16.4 (Kg/25 mm) | Manning Test |
| | Cross machine direction | 3.5 (lb/in) | 1.6 (Kg/25 mm) | #020 |
| | Tear (Machine Direction) | 70 (g) | 70 (g) | TAPPI T-414 |

-continued

| Product | Property | English Units | Metric Units | Test Method |
|---|---|---|---|---|
| 35# Manning® 532 | Basis Weight | 34.0 (lb/2880 ft$^2$) | 57.7 (g/m$^2$) | TAPPI T-410 |
| | Thickness | 4.9 (mil) | 0.124 (mm) | TAPPI T-411 |
| | Tensile: | | | |
| | Machine Direction | 34 (lb/in) | 15.2 (Kg/25 mm) | Manning Test |
| | Cross machine direction | 5.3 (lb/in) | 2.4 (Kg/25 mm) | #020 |
| | Tear (Machine Direction) | 105 (g) | 105 (g) | TAPPI T-414 |

The 18½# Manning® 456 paper has a machine direction to cross machine direction tensile strength ratio of about 8.97:1. The ratios for the 27½# Manning® 556 and 35# Manning® 532 products are about 10.29:1 and 6.42:1, respectively.

Various trials were run to face glass fiber insulation mats with traditional non-directional Kraft paper and directional Kraft paper. The line speed was run at 120 ft/min using 15"×93" folded Kraft batts split into two 7.5" wide pieces connected by an approximately ⅛" strip of uncut mat along the bottom of the mat. In the first trial, standard, non-directional EXOPACK 40# semi-extensible Kraft paper available from Canfor Co. was applied to the insulation batts with a bituminous layer, with a crease in the paper applied by two creasing bars in the production line. The facing layer did not tear well along the crease located above the connection between the two separable batt segments. The separation began at the crease point, but very quickly (within the first few inches of the edge of the paper) began a cross machine direction propagation rather than following the crease.

In a second production run, the standard Kraft paper was replaced by an uncreased 37# Manning® directional Kraft paper available from Lydall, Inc. It was observed that the faced insulation batt split better (compared to the non-directional Kraft paper) but exhibited some problems following the connection between the two separable segments. In a third production run, the 37# directional Kraft paper was creased prior to bonding to the insulation batt. A significant improvement was observed in the product; a hand tear or rip of the facing layer followed the crease very well until about the last 3" of the product.

In a fourth production run, 27# Manning® directional uncreased Kraft paper was bonded to the insulation batt. It was observed that the 27# paper tore more easily than the 37# sample, but the paper did not follow the split between the batt segments as well as the 37# creased sample. In a fifth production run, the 27# paper was creased prior to bonding to the insulation batt. It was observed that the paper split well along the crease but had a tendency to shatter occasionally across its width, i.e., in the cross machine direction. This result may be due to the reduction in paper weight from the 37# to 27# Kraft paper.

In a final production run, 0.00177" Manning® uncreased directional Kraft paper was bonded to the fiberglass batt. The paper has a described thickness of about 0.00177" and a paper weight of about 18.1#. The asphalt layer was very easy to see through the Kraft paper, and it proved difficult to keep wrinkles out of the paper as it was applied. The product separated very easily but tended to separate at one of the natural wrinkles in the Kraft. The trial with respect to this facing layer was then discontinued.

The following table indicates the product data available from Lydall on the tested directional Kraft papers:

| Product | Property | English Units | Metric Units | Test Method |
|---|---|---|---|---|
| 37# Manning® Kraft | Basis Weight | 37.0 (lb/2880 ft$^2$) | 62.8 (g/m$^2$) | TAPPI T-410 |
| | Thickness | 3.6 (mil) | 0.09 (mm) | TAPPI T-411 |
| | Tensile: | | | |
| | Machine Direction | 69 (lb/in) | 30.8 (Kg/25 mm) | TAPPI T-494 |
| | Cross machine direction | unavailable (lb/in) | unavailable (Kg/25 mm) | |
| | Tear (Machine Direction) | 58 (g) | 58 (g) | TAPPI T-414 |
| 27# Manning® 254 Insuldur | Basis Weight | 27.0 (lb/2880 ft$^2$) | 45 (g/m$^2$) | TAPPI T-410 |
| | Thickness | 2.74 (mil) | 0.070 (mm) | ASTM D-202A |
| | Tensile: | | | |
| | Machine Direction | 52 (lb/in) | 23.2 (Kg/25 mm) | TAPPI T-494 |
| | Cross machine direction | unavailable (lb/in) | unavailable (Kg/25 mm) | |

-continued

| Product | Property | English Units | Metric Units | Test Method |
|---|---|---|---|---|
| | Tear (Machine Direction) | 33 (g) | 33 (g) | TAPPI T-414 |
| .00177" Manning ® 250 Sep-R-Max ® | Basis Weight | 18.1 (lb/2880 ft$^2$) | 30.7 (g/m$^2$) | TAPPI T-410 |
| | Thickness | 1.87 (mil) | 0.047 (mm) | ASTM D-202A |
| | Tensile: | | | |
| | Machine Direction | 34 (lb/in) | 15.2 (Kg/25 mm) | TAPPI T-494 |
| | Cross machine direction | unavailable (lb/in) | unavailable (Kg/25 mm) | |
| | Tear (Machine Direction) | 20 (g) | 20 (g) | TAPPI T-414 |

In summary, the trial production runs illustrated that the directional Kraft paper does help create a fault plane for separation of the facing in the machine direction at a selected location. It was also observed that a crease, at least with the papers tested, is preferred to help define the fault plane, so that the paper does not select an undesired path of least resistance during separation. The 37# directional Kraft paper appears to be an acceptable facing layer when creased in the desired location, such as by creasing bars. It is believe that interlocking rollers may be preferred for creating the crease in full production. The 27# facing layer is potentially too thin in its current form for reliable use. It is believed that a directional Kraft facing layer between about 27-37#, such as 32# may provide an optimum balance of strength and cost.

Figure 3:
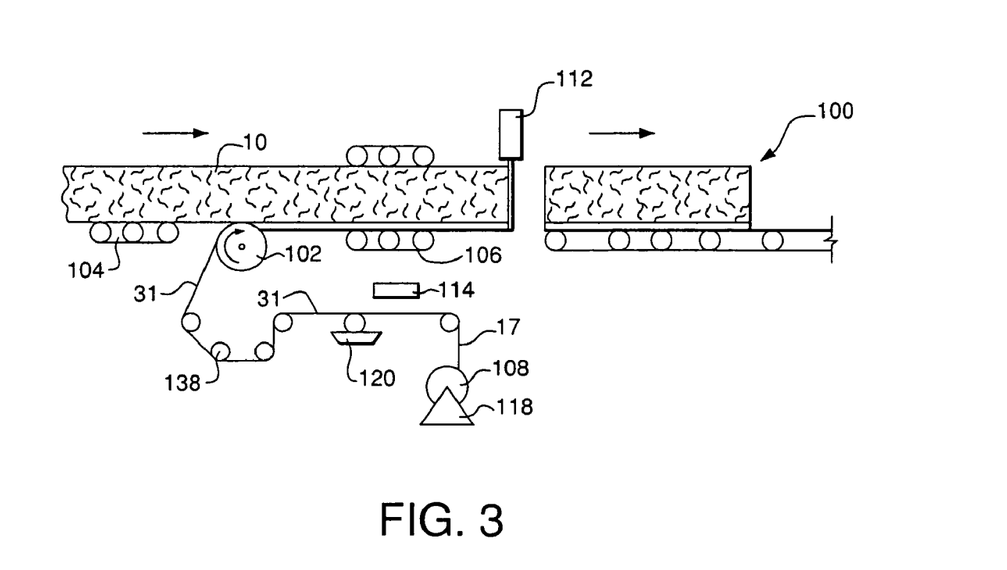
FIG. 3 is a schematic view illustrating a process of adhering a facing layer to an insulation mat.

FIG. 3 illustrates an exemplary method of adhering facing layer 31 to insulation sheet 10. As illustrated in FIG. 3, sheet 10, which preferably comprise two or more separable longitudinal segments, may be presented by the feed conveyer 104 to a heated roll 102, to which is simultaneously supplied a continuous web of bitumen-coated Kraft paper web 31, fed between the heated roll 102 and the sheet 10. The web of Kraft paper fed via roller 102 after being bitumen-coated is supplied from a roll 108 on payout stand 118, through an accumulator 138 for tensioning the Kraft paper web 31. In addition, the outside surface of the web can be marked at a marking station 114 with identifying information such as the R-value of the glass fiber sheet and the production lot code before the Kraft paper web 31 is applied to the bottom of the sheet 10. Optionally, the edges of the Kraft paper web 31 are folded over to form the side tabs 18, 19 (FIG. 1) just prior to the web contacting the heated roll 102. The Kraft paper web 31 is oriented so that the bitumen-coated side of the Kraft paper web 31 faces the bottom of the glass fiber sheet 10 and so that the paper has a higher tensile strength in the conveyed direction of sheet 10 (i.e., along the length of sheet 10) than across the width of sheet 10. The temperature is preferably selected to provide enough heat to soften the bituminous coating, which is supplied from bitumen source 120, such that the bitumen-coated Kraft paper web 31 adheres to the underside of the glass fiber sheet 10. The faced glass fiber sheet is transported away from the heated roll 102 by a tractor section 106 and delivered to a chopper 112, which periodically chops the faced glass fiber sheet to form insulation product 100 of appropriate length, e.g., 48-105" for insulation batts and 32-100' for insulation rolls.

Prior to or after facing the mat 10 with facing layer 31, the mat 10 may also be provided to a slicer (not shown), which slices the mat into sections or strips having desired widths, e.g., 15", some of which may be further sectioned to form the separable segments of mat 10 discussed above. The insulation products 100 so formed are then transported to packaging equipment (not shown). If the slicer is disposed prior to application of facing 31, facing layer 31 is provided from separate rolls 108 spaced to provide an individual facing layer 31 of appropriate width to each sliced section of sheet 10.

As described above, mat 10 includes a plurality of separable segments. In one embodiment shown in FIGS. 1 and 1A, mat 10 includes two or more segments that are coupled together along their lengths by an adhesive 20. Commonly assigned U.S. patent application Ser. No. 10/779,181, entitled "Method and Apparatus for Adhering Together Lanes of Compressible Products", filed Feb. 11, 2004, now U.S. Pat. No. 7,060,148, and U.S. patent application Ser. No. 10/690,295, entitled "Separable Fibrous Insulation", filed Oct. 21, 2003, the entirety of which are hereby incorporated by reference herein, describe segmented mat 10 and exemplary methods of making the same. In one embodiment described therein, a wedge device is inserted between two separate lanes of a compressible product, such as an insulation mat, to split apart at least a portion of the lanes of product. Either the wedge device or the separate lanes of the compressible product are advanced to move the wedge device and lanes relative to one another. An adhesive is applied onto an inside wall of one or both of the lanes of the compressible product while at least a portion of the lanes are split. The inside walls of the lanes are then contacted to form a single adhered product, such as mat 10 shown in FIG. 1A including a plurality of separable segments.

Figure 4:
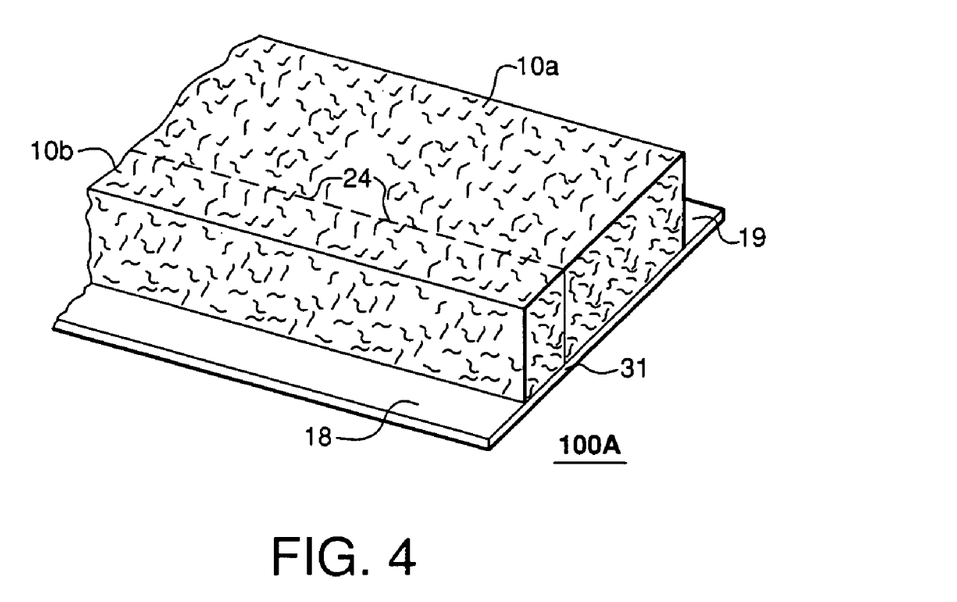
FIG. 4 is a top plan view of a faced insulation product having a perforated insulation mat.

Although FIGS. 1 and 1A illustrate an embodiment of mat 10 formed from two completely separate segments joined by an adhesive, other forms of separable segments are contemplated and may be appropriate. For example, segments 10a and 10b may initially only be partially separated and then reconnected with adhesive 20. Further Weinstein I illustrates in, for example, FIGS. 2-7 thereof a mat having perforated cuts therethrough, leaving separable connectors (formed from the insulation mat) remaining to connect the lengthwise segments of the insulation mat. Weinstein I also discloses a method of forming the perforated mats using water jet cutting or compression cutting stations and rotary cutting saw stations as shown in and described in connection with, for example, FIGS. 16-18 of Weinstein I Likewise, commonly assigned U.S. Patent Application Ser. Nos. 60/540,764, entitled "Segmented Band Joist Batts and Method of Manufacture" and 10/851,877, entitled "Kit of Parts for Band Joist Insulation and Method of Manufacture", both filed Jan. 30, 2004, describe an insulation blanket that is partially or completely divided into separable longitudinal sections by a lengthwise kerf to provide two or more lengthwise segments. FIG. 4 is a perspective view of an insulation product 100A including an insulation blanket having separable segments 10a and 10b coupled together and divided by kerf 24 formed, for example, using a chopping blade or saw.

From the foregoing, a modular faced insulation product is provided that provides for user friendly field separation into smaller segments while not compromising the vapor retarder barrier thereon. In some embodiments, a facing layer having reduced width and/or paper weight but of sufficient cross machine direction tear strength may be achieved. The process of forming a faced insulation product is also simplified in that various facing layers each having different perforation locations are not required for different modular products and need not be stored and/or the step of perforating the facing layer can be eliminated or reduced. Cost saving attributable to materials and storage thereof may be realized.

Although the insulation product has been described as including a facing with its improved machine direction fiber orientation oriented along the length of the insulation product, such that the facing layer and mat can be split into separate longitudinal segments, the facing layer may alternatively be adhered to the insulation mat such that the machine direction of the facing layer aligns with the width of the mat rather than the length of the mat. In this embodiment, the mat of the insulation product may be made separable into mats of varying length rather than width.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A method of manufacturing an insulation product, comprising the following steps:
   providing an insulation mat comprising randomly oriented fibers, said mat having first and second major surfaces and a pair of side portions;
   adhering a non-woven vapor retardant facing layer to at least one of the major surfaces of the mat, said facing layer having a fiber orientation such that said facing layer has a ratio of machine direction tensile strength to cross machine direction tensile strength which permits said facing layer to be separated by hand along a substantially straight line selected in said machine direction; and
   prior to said adhering step, creasing said facing layer in said machine direction along at least one selected separation line.

2. The method of claim 1, wherein said providing step includes the step of conveying said insulation mat in said machine direction.

3. The method of claim 1, wherein said facing layer comprises a cellulosic material, said adhering step comprising the step of bonding said facing layer to said insulation mat with a vapor retardant adhesive.

4. The method of claim 3, wherein said cellulosic material comprises kraft paper.

5. The method of claim 4, wherein said vapor retardant adhesive includes a bituminous material.

6. The method of claim 2, wherein said vapor retardant adhesive includes a bituminous material.

7. The method of claim 1, wherein said ratio is at least about 4:1.

8. The method of claim 1, wherein said insulation mat includes a plurality of separable segments, said segments being coupled to each other along planes oriented in said machine direction.

9. The method of claim 8, further comprising the steps of, prior to adhering said facing layer, forming said separable segments in said insulation mat and coupling said separable segments to each other with an adhesive.

10. The method of claim 1, wherein said facing layer includes a central portion coextensive with said at least one major surface and at least one tab portion adjacent said central portion and extending beyond said at least one major surface.

11. The method of claim 1, wherein said facing layer is non-perforated in at least said machine direction.

12. The method of claim 1, wherein said ratio is between about 4:1 to 20:1.

13. The method of claim 1, wherein said ratio is between about 6:1 to 15:1.

14. The method of claim 1, wherein said facing layer comprises polymeric, cellulosic or inorganic fibers or a combination thereof.

15. A method of forming a reduced width insulation product from a master insulation product for installation in a structure, comprising the steps of:
   providing a master insulation product comprising:
      an insulation mat comprising randomly oriented fibers, said mat having first and second major surfaces and a pair of side portions; and
      a non-woven facing layer comprising a cellulosic material bonded to said insulation mat with a vapor retardant adhesive, said facing layer having a fiber orientation such that the facing layer has a ratio of machine direction tensile strength to cross machine direction tensile strength which permits the facing layer to be separated by hand along a substantially straight line selected in the machine direction,
      wherein said insulation mat includes a plurality of separable segments, said segments being coupled to each other along at least one plane oriented in said machine direction; and
   separating said facing layer in said machine direction substantially along a plane from said at least one plane to remove at least one of said separable segments from said master insulation product, thereby providing a reduced width insulation product.

16. The method of claim 15, wherein said ratio is at least about 4:1.

17. The method of claim 15, wherein said separable segments are coupled to each other with an adhesive, a perforation in said insulation mat along said at least one plane, or a partial cut through said mat along said at least one plane.

18. The method of claim 15,
   wherein said facing layer includes a central portion coextensive with said at least one major surface and at least one tab portion adjacent said central portion extending beyond said at least one major surface, and
   wherein said reduced width insulation product includes said at least one tab portion.

19. The method of claim 15, further comprising the step of installing said reduced width insulation product in a structure.

20. The method of claim 15, wherein said facing layer is creased in said machine direction along said plane from said at least one plane prior to separating said facing layer.

21. The method of claim 15, wherein said cellulosic material comprises kraft paper.

22. The method of claim 15, wherein said vapor retardant adhesive includes a bituminous material.

23. The method of claim 15, wherein said ratio is between about 4:1 to 20:1.

24. The method of claim 15, wherein said ratio is between about 6:1 to 15:1.

25. A method of manufacturing an insulation product, comprising the following steps:
   conveying a fibrous insulation blanket in a conveying direction, the blanket having a length along the conveying direction, a width and a thickness, the blanket having a first major surface and a second major surface which each extend for the length and the width of the fibrous insulation blanket, the fibrous insulation blanket including a plurality of longitudinal segments being separable along one or more longitudinally extending interfaces, spaced inward from lateral edges of the blanket and spaced apart from each other across the width of the fibrous insulation blanket, into a plurality of blanket segments of lesser width than the width of the fibrous insulation blanket; and
   adhering a vapor retardant facing layer to at least one of the major surfaces of the blanket as it is being conveyed, said facing layer comprising a paper layer having a fiber orientation arranged such that said facing layer has a ratio of machine direction tensile strength to cross machine direction tensile strength which permits said facing layer to be separated by hand along a substantially straight line selected in said machine direction, wherein the machine direction corresponds to the conveying direction, wherein the paper layer is imperforated in the machine direction in areas thereof overlying the longitudinally extending interfaces.

26. The method of claim 25, wherein the adhering step comprises the step of bonding the paper layer to the insulation mat with a vapor retardant adhesive.

27. The method of claim 26, wherein the vapor retardant adhesive includes a bituminous material.

28. The method of claim 25, wherein the paper layer is a layer of kraft paper.

29. The method of claim 26, wherein the ratio is at least about 4:1.

30. The method of claim 26, wherein the ratio is between about 4:1 to 20:1.

31. The method of claim 26, wherein the ratio is between about 6:1 to 15:1.

32. The method of claim 26, further comprising the step of, prior to said adhering step, creasing the paper layer in the machine direction along at least one selected separation line overlying at least one of the interfaces.

33. The method of claim 25, wherein the paper layer is creased in the machine direction along at least one separation line overlying at least one of the interfaces.

* * * * *